United States Patent
Bertz et al.

(10) Patent No.: US 10,111,088 B1
(45) Date of Patent: Oct. 23, 2018

(54) METHOD AND SYSTEM FOR ASSOCIATING A USER IDENTIFIER WITH A DEVICE IDENTIFIER

(71) Applicant: Sprint Spectrum L.P., Overland Park, KS (US)

(72) Inventors: Lyle T. Bertz, Lee's Summit, MO (US); Jeremy R. Breau, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 574 days.

(21) Appl. No.: 14/551,209

(22) Filed: Nov. 24, 2014

Related U.S. Application Data

(63) Continuation of application No. 11/500,706, filed on Aug. 8, 2006, now Pat. No. 8,898,249.

(51) Int. Cl.
*H04W 8/26* (2009.01)
*H04W 60/00* (2009.01)
*H04L 29/12* (2006.01)
*H04L 29/08* (2006.01)

(52) U.S. Cl.
CPC .......... *H04W 8/26* (2013.01); *H04L 61/1511* (2013.01); *H04L 61/1588* (2013.01); *H04L 61/2007* (2013.01); *H04W 60/00* (2013.01); *H04L 29/08288* (2013.01)

(58) Field of Classification Search
CPC ......... H04L 29/12047; H04L 29/12066; H04L 29/08288; H04L 61/1511
See application file for complete search history.

(56) References Cited

U.S. PATENT DOCUMENTS

| | | |
|---|---|---|
| 6,445,922 B1 | 9/2002 | Hiller et al. |
| 6,728,536 B1 * | 4/2004 | Basilier et al. ............ 455/432.1 |
| 6,747,961 B1 | 6/2004 | Ahmed et al. |
| 6,807,423 B1 | 10/2004 | Armstrong et al. |
| 6,971,028 B1 | 11/2005 | Lyle et al. |
| 6,987,781 B1 | 1/2006 | Miller et al. |
| 7,012,916 B2 | 3/2006 | Low et al. |
| 8,898,249 B1 | 11/2014 | Bertz et al. |

(Continued)

FOREIGN PATENT DOCUMENTS

KR 1020040063860 * 2/2006

OTHER PUBLICATIONS

Nikkei, Bruce J., "An introduction to investigating IPv6 networks", Jun. 1, 2007, pp. 59-67.*
Williamson et al., Network Working Group, "Referral Whois (RWhois) Protocol V1.5", Request for Comments 2167, Jun. 1997.*
Williamson et al., Network Working Group, "Referral Whois (RWhois) Protocol VI .5", Request for Comments 2167, Jun. 1997.*

(Continued)

*Primary Examiner* — Salvador E Rivas

(57) ABSTRACT

A user, identified by a network access identifier (NAI) or other user identifier, uses a communication device, identified by a hostname or other device identifier. An Internet Protocol (IP) address is obtained for the communication device, e.g., when the user logs in for access to a packet-switched network. An association between the IP address and the hostname is registered in a domain name server. An association between the user identifier and the hostname is registered in an RWHOIS server. An application may query the RWHOIS server to determine the hostname of the communication device being used by the user and then query the domain name server to determine the IP address of the communication device.

14 Claims, 3 Drawing Sheets

(56) References Cited

U.S. PATENT DOCUMENTS

| | | | |
|---|---|---|---|
| 2002/0126701 A1* | 9/2002 | Requena | 370/469 |
| 2003/0041154 A1 | 2/2003 | Tran | |
| 2004/0190534 A1* | 9/2004 | Adrangi | H04L 29/06 370/400 |
| 2004/0199608 A1* | 10/2004 | Rechterman | G06Q 10/10 709/220 |
| 2005/0030917 A1 | 2/2005 | Haller et al. | |
| 2005/0054343 A1 | 3/2005 | Nykanen et al. | |
| 2005/0157707 A1 | 7/2005 | Sternagle | |
| 2005/0193076 A1 | 9/2005 | Flury et al. | |
| 2005/0223115 A1 | 10/2005 | Hanson et al. | |
| 2006/0018272 A1 | 1/2006 | Mutikainen et al. | |
| 2006/0121916 A1 | 6/2006 | Aborn et al. | |
| 2006/0129503 A1 | 6/2006 | Roberts, III et al. | |
| 2006/0179472 A1 | 8/2006 | Chang et al. | |
| 2006/0224752 A1* | 10/2006 | Parekh | 709/230 |
| 2007/0002899 A1 | 1/2007 | Raman et al. | |
| 2008/0010377 A1* | 1/2008 | Nissennboim | H04L 63/20 709/226 |
| 2008/0034421 A1* | 2/2008 | Ahn et al. | 726/17 |
| 2010/0281535 A1* | 11/2010 | Perry et al. | 726/22 |

OTHER PUBLICATIONS

Vixie et al., Network Working Group, "Dynamic Updates in the Domain Name System (DNS Update)", Request for Comments 2136, Apr. 1997.*

S. Williamson et al., Network Working Group, "Referral Whois (RWhois) Protocol V1.5", Request for Comments 2167, Jun. 1997.

P. Mockapetris, Network Working Group, "Domain Names—Concepts and Facilities", Request for Comments 1034, Nov. 1987.

P. Mockapetris, Network Working Group, "Domain Names—Implementation and Specification", Request for Comments 1035, Nov. 1987.

P. Vixie et al., Network Working Group, "Dynamic Updates in the Domain Name System (DNS Update)", Request for Comments 2136, Apr. 1997.

A. Gulbrandsen et al., Network Working Group, "A DNS RR for Specifying the Location of Services (DNS SRV)", Request for Comments 2782, Feb. 2000.

B. Aboba et al., Network Working Group, "The Network Access Identifier", Request for Comments 4282, Dec. 2005.

* cited by examiner

METHOD AND SYSTEM FOR ASSOCIATING A USER IDENTIFIER WITH A DEVICE IDENTIFIER

CROSS-REFERENCE TO RELATED APPLICATIONS

This application is a continuation of U.S. patent application Ser. No. 11/500,706, filed Aug. 8, 2006, which application is incorporated herein by reference.

BACKGROUND

1. Field of the Invention

The present invention relates to telecommunications and, more particularly, to methods and systems for associating an identifier of a user with an identifier of a communication device being used by the user.

2. Description of Related Art

In the traditional model of wireless telecommunications, user and device are often treated as being linked together. For example, a wireless communication device, such as a wireless telephone, may be associated with a mobile directory number (MDN) such that calls to that MDN are routed to that particular wireless telephone. In addition, the MDN may also be used to identify a particular user, e.g., a user's account and the services to which the user has subscribed.

However, users are increasingly using different types of communication devices to access packet-based services, such as Web browsing, voice-over-packet (VoP) communication or streaming media. For example, a user may use a wireless communication device when away from home but may switch to a landline communication device, such as a personal computer, when the user is at home. Thus, a user might use different communication devices at different times. As another possibility, a user might be logged onto multiple communication devices at the same time. In addition, the same communication device may be used by different users at different times. The different users may subscribe to different services and may have different preferences applied when using the communication device.

This possibility that a user could be using any of a plurality of different communication devices at a given time can create challenges. For example, it may be difficult to direct an instant message or other notification to a particular user when that user could be using any one of multiple communication devices at a particular time. The problem is exacerbated by the possibility that the IP address of a user's communication device may also be variable. For example, an IP address may be dynamically assigned to a communication device on a temporary basis, e.g., for a particular communication session. In addition, a wireless communication device's IP address may change when the device moves between wireless coverage areas.

Accordingly, there is a need for methods and systems that can keep track of which communications devices are currently being used by which users.

SUMMARY

In a first principal aspect, an exemplary embodiment of the present invention provides a method for registering information regarding a communication device being used by a user. The communication device has a device identifier, and the user has a user identifier. In accordance with the method, a network address for the communication device is obtained. A first association between the network address and the device identifier is registered. A second association between the device identifier and the user identifier is registered.

In a second principal aspect, an exemplary embodiment of the present invention provides a method for obtaining information regarding a user having a user identifier. In accordance with the method, a first query is sent to a first server. The first query includes the user identifier. A first response is received from the first server. The first response includes a hostname associated with the user identifier. A second query is sent to a second server. The second query includes the hostname. A second response is received from the second server. The second response includes a network address associated with the hostname.

In a third principal aspect, an exemplary embodiment of the present invention provides a system comprising a first register, a second register, and an application. The first register stores a first association between a hostname of a communication device and a user identifier of a user of the communication device. The second register stores a second association between the hostname and a network address of the communication device. The application is configured to query the first register to determine the first association and to query the second register to determine the second association.

DETAILED DESCRIPTION OF EXEMPLARY EMBODIMENTS

1. Overview

Figure 1:
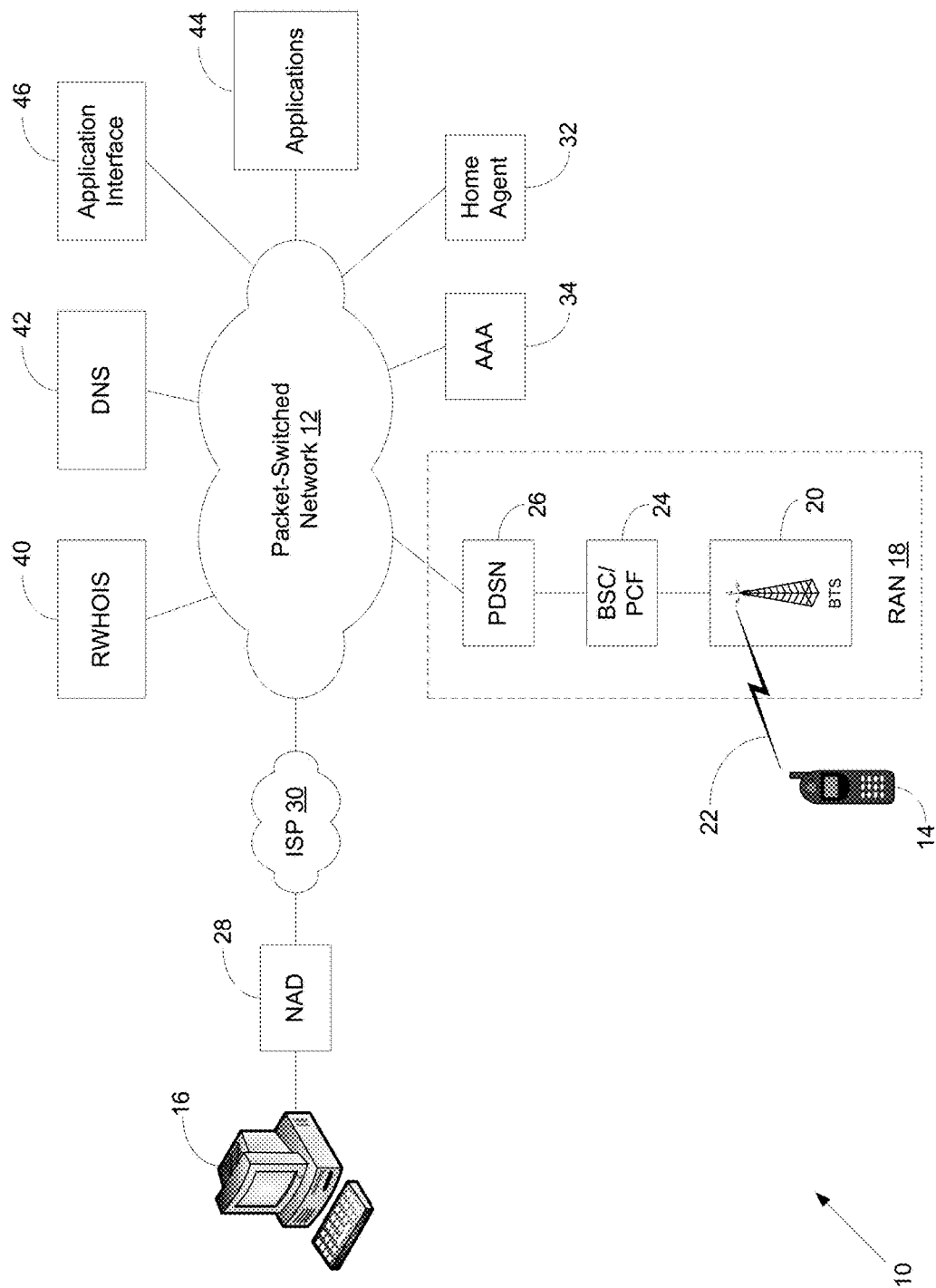
FIG. 1 is a block diagram of a telecommunications network, in accordance with an exemplary embodiment.

When a user, identified by a user identifier, uses a communication device, identified by a device identifier, to access a packet-switched network, an association between the user identifier and the device identifier may be maintained. The communication device could be a wireless communication device, such as a wireless telephone, wireless personal digital assistant (PDA), or wirelessly-equipped laptop computer. Alternatively, the communication device could be a landline communication device, such as a personal computer (PC).

The user identifier could be, for example, a network access identifier (NAI). The NAI may be as described in B. Aboba et al., "The Network Access Identifier," Request for Comments 4282, December 2005, which is incorporated herein by reference. The device identifier could be, for example, a hostname.

The hostname could be, for example, chosen by the user or assigned by the service provider that provides the access to the packet-switched network. When the hostname is assigned by the service provider, the hostname may include a device-specific field concatenated with a domain name associated with the service provider. For a wireless communication device, the device-specific field could be, for example, the device's electronic serial number (ESN) or mobile directory number (MDN). Thus, the hostname of a wireless communication device that has 816-555-1234 as its MDN and a wireless service plan with Sprint Nextel might be 8165551234.sprintnextel.com.

The association between the user identifier and the device identifier may be stored in a register as a result of a registration process. In an exemplary embodiment, the register is an RWHOIS server, and the registration process uses the RWHOIS protocol. A recent version of the RWHOIS protocol is described in S. Williamson et al., "Referral Whois (RWhois) Protocol V1.5," Request for Comments 2167, June 1997, which is incorporated herein by reference. The registration may occur in response to a network address, such as an Internet Protocol (IP) address, being assigned to the communication device. The IP address assignment may occur when the user "logs in" or otherwise obtains access to a packet-switched network using the communication device. The IP address assignment may also occur in other situations, for example, when the communication device changes its point of attachment to the packet-switched network.

When the association between the user identifier and the device identifier is registered, an association between the device identifier and the IP address assigned to the communication device may also be registered. For example, the communication device may be identified by a hostname and may register an association between the hostname and the IP address with a domain name server (DNS). Various aspects of the domain name system are described in P. Mockapetris, "Domain Names—Concepts and Facilities," Request for Comments 1034, November 1987 and in P. Mockapetris, "Domain Names—Implementation and Specification," Request for Comments 1035, November 1987, which documents are incorporated herein by reference.

In this way, a first register (e.g., an RWHOIS server) may store an association between a user identifier of a user and a device identifier of the communication device being used by the user, and a second register (e.g., a DNS server) may store an association between the device identifier and the IP address assigned to the communication device. Authorized applications may then query these registers, either directly or via an application interface, to determine these associations. For example, to obtain information regarding a particular user, an application may query an RWHOIS server with the user's identifier to determine the hostname of the communication device being used by the user. The application may then query a DNS server to determine the IP address assigned to the communication device.

The association between user identifier and device identifier that is stored in an RWHOIS server or other register may be kept current by the use of a registration lifetime. In particular, if the registration lifetime passes without the association being re-registered, the association may be removed. In addition, a communication device may de-register an association when it is no longer valid, e.g., when the user "logs off" or ends a communication session. In this way, an application can determine that an association obtained from an RWHOIS server or DNS server is current to within the registration lifetime.

2. Exemplary Network Architecture

FIG. 1 illustrates an exemplary telecommunications network 10. Network 10 includes a packet-switched network 12 that can be accessed by communication devices, such as wireless communication device 14 and landline communication device 16. Packet-switched network 12 is a network that conveys voice, data, and/or other media in the form of packets. Packet-switched network 12 may include one or more local area networks (LANs), metropolitan area networks (MANs) and/or wide area networks (WANs). For example, packet-switched network 12 may include the Internet. Packets may be routed in packet-switched network based on network addresses, e.g., using the Internet Protocol (IP) in combination with the User Datagram Protocol (UDP) or Transmission Control Protocol (TCP).

Communication devices, such as wireless communication device 14 and landline communication device 16, may access packet-switched network 12 in order to access Web content, to receive streaming video or other media, for voice-over-packet (VoP) communication, to send or receive e-mail, or for other purposes. Wireless communication device 14 may be a device, such as a wireless telephone, wireless personal digital assistant (PDA), wirelessly-equipped laptop computer, or other device that communicates wirelessly, e.g., via an air interface. Landline communication device 16 may be a device, such as a personal computer, that communicates via a landline connection.

Wireless communication device 14 may access packet-switched network 12 via a radio access network (RAN) 18. RAN 18 could be, for example, a wireless local area network (WLAN) that communicates with wireless device 14 via an air interface protocol, such as IEEE 802.11 (WiFi), HomeRF, HiperLAN, or Bluetooth, a wireless metropolitan network (WMAN) that communicates with wireless device 14 via an air interface protocol such as IEEE 802.16 (WiMAX), or a wireless wide area network (WWAN) that communicates with wireless device 14 via an air interface protocol such as 1xRTT, EV-DO, GSM/GPRS, or UMTS. As a WWAN, RAN 18 may include a base transceiver station (BTS) 20 that communicates with wireless device 14 via an air interface 22. BTS 20 may be controlled by a base station controller (BSC) 24. BSC 24 may include a packet control function (PCF) that is communicatively coupled to packet-switched network 12 via a packet data serving node 26.

It is to be understood that RAN 18 shown in FIG. 1 is exemplary only, as packet-switched network 12 could be connected to RANs having other configurations. In addition, it is to be understood that packet-switched network 12 may be connected to multiple RANs. In particular, wireless communication device 14 may be able to move from one RAN to another and, thereby, change its point of connection to packet-switched network 12.

Landline communication device 16 may access packet-switched network 12 via a network access device (NAD) 28, such as a cable modem, DSL modem, or router. NAD 28 may be communicatively coupled to packet-switched network 12 via an Internet Service Provider (ISP) network 30.

In order to access packet-switched network 12, a communication device, such as wireless communication device 14 or landline communication device 16, may be assigned a network address, such as an IP address. The IP address could be either an IPv4 or IPv6 address. The IP address could be assigned in either a Simple IP or Mobile IP process. In a Simple IP process, the IP address may be assigned by a DHCP server, e.g., in RAN 18 or in ISP network 30. Typically, the IP address would be re-assigned when the device changes its network connectivity, such as when wireless communication device 14 moves from one RAN to another. In a Mobile IP process, the IP address may be assigned by a home agent 32. In that case, the IP address may remain valid even when a communication device changes its network connectivity.

An authentication process may be required before a communication device is assigned an IP address. For example, a user of a communication device, such as wireless communication device 14 or landline communication device 16, may enter a user identifier (such as NAI), password, and/or other information in a "log in" process. This information may be transmitted in a hashed form to an authentication, authorization, and accounting (AAA) server 34. If AAA server 34 is able to authenticate the information, then the communication device may be assigned an IP address and granted access to packet-switched network 12.

In some cases, a user may be able to access packet-switched network 12 from any of a plurality of communication devices. For example, a user may log in using wireless communication device 14 at one time and, at another time, log in using a different communication device (e.g., using a different wireless communication device or using landline communication device 16) using the same user identifier and password. It may also be possible for different users to use the same communication device at different times. Thus, different users may log in with the same communication device but with different user identifiers.

In this way, users may be associated with different communication devices at different times. In addition, devices may be associated with different IP addresses at different times. To keep track of these varying associations, network 10 may include an RWHOIS system 40 and a DNS system 42 communicatively coupled to packet-switched network 12. RWHOIS may system 40 store associations between user identifiers and device identifiers. DNS system 42 may store associations between device identifiers and IP addresses.

The associations stored in RWHOIS system 40 and DNS system 42 may be created or updated by registration processes. For example, when a communication device, such as wireless communication device 14 or landline communication device 16, is assigned an IP address, the communication device may register an association between an identifier of the user (e.g., the user's NAI) and an identifier of the device (e.g., a hostname) with RWHOIS system 40 and may register an association between the device identifier (e.g., hostname) and the device's IP address with DNS system 42. Alternatively, one or both of these registrations may be accomplished by a different network element, such as a DHCP server, on behalf of the communication device.

Network 10 may include one or more applications 44 that can query RWHOIS system 40 and DNS system 42, either directly or indirectly, to determine current associations between users and devices and/or between devices and IP addresses. Applications 44 may seek these associations for various reasons. As one example, applications 44 may use these associations to support presence-based services such as instant messaging or to facilitate the continuation of a communication session when a user's device changes IP address. As another example, applications 44 may use the associations for security purposes, e.g., to verify that an IP address corresponds to a valid user that is currently logged in. As yet another example, applications 44 may use the associations for diagnostic purposes, e.g., to locate a communication device for which the user has reported a problem. It is to be understood that these uses are exemplary only, as applications 44 may use the associations stored in RWHOIS server 40 and/or in DNS server 42 in other ways.

In some embodiments, applications 44 may make separate queries directly to RWHOIS system 40 and DNS system 42. For example, an application might first query RWHOIS system 40 to obtain a hostname associated with an NAI and then query DNS system 42 to obtain an IP address associate with the hostname. However, network 10 could also include an application interface 46 that queries RWHOIS system 40 and DNS system 42 on behalf of applications 44. Thus, an application might make a single query to application interface 46, and application interface 46 may query RWHOIS system 40 and/or DNS system 42 as needed to respond to the application's query.

RWHOIS system 40 may include a plurality of RWHOIS servers in order to store information in a hierarchical fashion. In particular, the user identifiers stored in RWHOIS system 40 may be lexically hierarchical, in that each user identifier may include one or more hierarchical labels that determine its position in the RWHOIS hierarchy. For example, an NAI be in the form of username@realm. The "realm" may be in the form of labels separated by "." symbols, with each label indicating a certain level or branch in the RWHOIS hierarchy. Thus, a user's NAI could be user@homerealm.example.net. The realm in this example NAI would be homerealm.example.net. This realm would be part of a higher-level zone indicated by example.net, which, in turn, would be part of an even higher-level zone indicated by the .net label. The NAI and its associated information may be stored within RWHOIS system 40 in a "low-level" RWHOIS server that has authority over a zone that includes the realm of homerealm.example.net. Thus, when queried for information associated with an NAI with the homerealm.example.net realm, the RWHOIS server would be able to respond with the requested information.

However, RWHOIS system 40 may also include higher-level RWHOIS servers that correspond to higher-level zones, such as example.net and .net. A higher-level RWHOIS server might not store the actual information being sought by a query for a particular NAI. A higher-level RWHOIS server may instead refer such a query to a lower-level RWHOIS server based on the hierarchical labels in the NAI. The lower-level RWHOIS server would either have the requested information for that NAI or would be able to refer the query to an even lower-level RWHOIS server. In this way, RWHOIS system 40 may store information in a hierarchical fashion such that information for a particular NAI might be stored in only one, authoritative RWHOIS server, with the other RWHOIS servers being able to refer queries for that particular NAI to the authoritative RWHOIS server that stores the information for that NAI.

An association that is stored in an RWHOIS server in RWHOIS system 40 may include an NAI or other identification of a user and a hostname or other identification of the communication device being used by the user. The association may also include other information. For example, the association may include an establishment time, which may indicate the time that the user successfully logged in and was assigned an IP address. The association may also include a registration lifetime, which may indicate the period of time for which the association is valid. The establishment time and registration lifetime may be supplied by the communication device during registration. Alternatively, the RWHOIS server may assign the registration lifetime in response to the registration. The association may also include a "nonce" or key that the RWHOIS server may use to authenticate re-registrations or de-registrations from the communication device. The nonce may be randomly or pseudo-randomly generated by the communication device and passed to the RWHOIS server during registration. In addition, an association stored by an RWHOIS server may include other information.

DNS system 42 may also include a plurality of DNS servers in order to store information in a hierarchical fashion. For example, the hostnames stored in DNS system 42 as device identifiers may be fully qualified domain names and, thus, lexically hierarchical. When a DNS server is queried for information regarding a given hostname, the DNS server may either respond with the information or refer the query to another DNS server so as to eventually reach the DNS server that stores the requested information.

The associations stored in a DNS server in DNS system 42 may be in the form of one or more resource records (RRs). The RRs may include, for example, address RRs and service RRs (SRVs). An address RR may associate a hostname that identifies a communication device being used by a user with a network address (e.g., an IPv4 or IPv6 address) that has been assigned to the communication device. An SRV may include a service identifier that identifies a particular service that the device identified by the hostname is using for communication. The identified services may include, for example, the Session Initiation Protocol (SIP), Multimedia Messaging Service (MMS), Simple Mail Transfer Protocol (SMTP), HyperText Transfer Protocol (HTTP), Real Time Streaming Protocol (RTSP), Remote Synchronization (Rsynch), and location services. Other services could also be identified. The service identifier may be a standardized identifier, for example, registered with the Internet Assigned Numbers Authority (IRNA). An SRV may also include various items of information that relate to the service. For example, an SRV identifying a SIP service may include a SIP URI. Additional information regarding SRVs may be found in A. Gulbrandsen, "A DNS RR for specifying the location of services (DNS SRV)," Request for Comments 2782, February 2000, which is incorporated herein by reference.

The associations stored in a DNS in DNS system 42 may also include other information. For example, an association may have a registration lifetime, such that the association is automatically removed if not renewed within the registration lifetime. The registration lifetimes used in DNS system 42 could be, but need not be, the same as the registration lifetimes used in RWHOIS system 40.

3. Exemplary Operation

Figure 2:
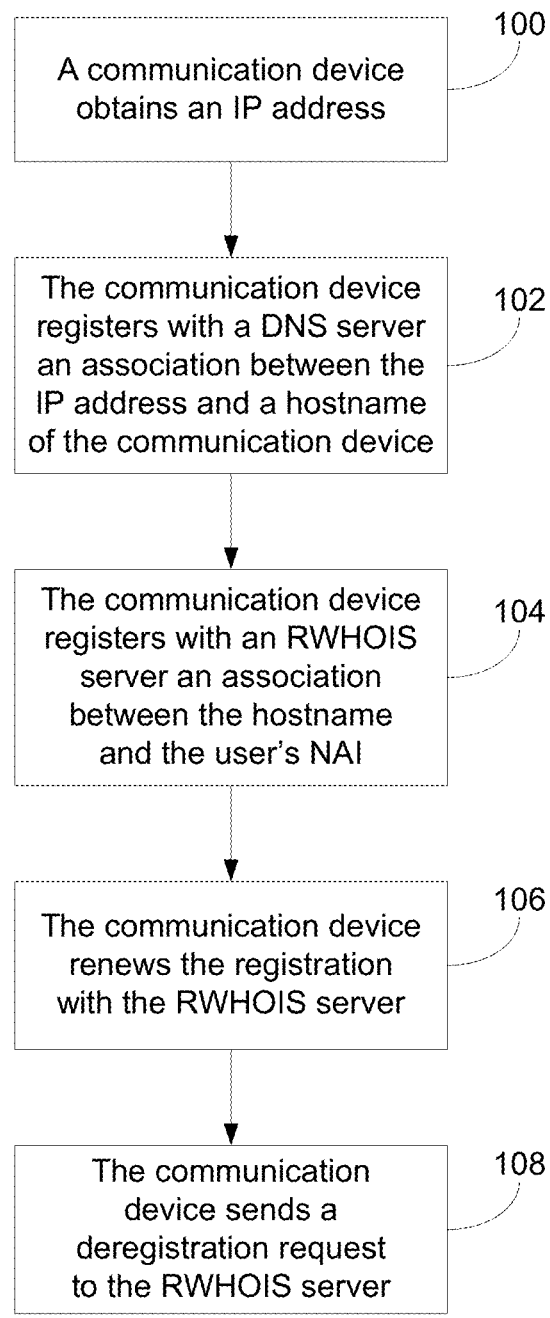
FIG. 2 is a flow chart illustrating a method for registering associations, in accordance with an exemplary embodiment.

FIG. 2 is a flowchart illustrating an exemplary method for maintaining associations in an RWHOIS server (e.g., in RWHOIS system 40) and in a DNS server (e.g., in DNS system 42). The process is described with respect to the exemplary telecommunications network 10 illustrated in FIG. 1. However, it is to be understood that other network architectures could be used.

The process may begin when a communication device (e.g., wireless communication device 14 or landline communication device 16) obtains an IP address, as indicated by block 100. The IP address could be either an IPv4 or IPv6 address. The IP address could be obtained through a Simple IP process (e.g., assigned by a DHCP server) or through a Mobile IP process (e.g., assigned by a home agent).

In some cases, the communication device may obtain the IP address when the user successfully "logs in" for access to packet-switched network 12, e.g., after successful authentication by AAA server 34. In other cases, the communication device may obtain the IP address in connection with the establishment of a communication session through packet-switched network 12, e.g., when originating or receiving a VoP call. In still other cases, the communication device may obtain the IP address as a result of moving through the network. For example, a wireless communication device with an existing IP address may move to a new wireless coverage area and receive a new IP address.

In response to obtaining the IP address, the communication device may register with a DNS server an association between the IP address and a hostname of the communication device, as indicated by block 102. The communication device may do this, for example, by sending a DNS UPDATE message to the DNS server. A recent version of the DNS UPDATE protocol is described in P. Vixie et al., "Dynamic Updates in the Domain Name System (DNS UPDATE)," Request for Comments 2136, April 1997, which is incorporated herein by reference. The communication device may also associate a service with the hostname when registering with the DNS server. The service may correspond to an application that the communication device is using to communicate via the packet-switched network.

In response to obtaining the IP address, the communication device may also register with an RWHOIS server an association between the device's hostname and the user's NAI, as indicated by block 104. The communication device may do this by sending the RWHOIS server a "-register" directive, in accordance with the RWHOIS protocol. The registration session with the RWHOIS server could be secured, for example, using the Transport Layer Security (TLS) protocol.

The association information that the communication device sends to the RWHOIS server may include the device's hostname, the user's NAI, the establishment time, and a nonce generated by the communication device. The RWHOIS server may also include other information with the association, such as a registration lifetime (though this information could alternatively be supplied by the communication device). Upon successful registration, the RWHOIS server may send the communication device an acknowledgement message that includes the registration lifetime and/or other information that the RWHOIS server added to the association.

In an exemplary embodiment, the communication device may carry out the registrations with the DNS server and the RWHOIS server in parallel, i.e., essentially simultaneously. Alternatively, the communication device may carry out the registrations sequentially, doing either the DNS registration or the RWHOIS first. It is also to be understood that one or more other network elements may carry out one or both of the registrations instead of the communication device.

At some point, the communication device may renew its registration with the RWHOIS server, as indicated by block 106. The communication device may do this by re-registering the association with the RWHOIS server within the registration lifetime. In some embodiments, the communication device might be required to present the nonce used for the initial registration and/or other credentials in order for the RWHOIS server to accept the re-registration. If the registration is not renewed within the registration lifetime, then the RWHOIS server may remove it.

The communication device may also renew its registration with the DNS server. The registration renewal with the DNS server might occur at the same time as the registration renewal with the RWHOIS server. Alternatively, the registration renewals might occur at different times, e.g., because of different registration lifetimes in the RWHOIS and DNS servers.

The communication device may also send a de-registration request to the RWHOIS server, as indicated by block 108. The communication device may do this, for example, when the user "logs off" or a communication session through packet-switched network 12 is torn down. Upon successful de-registration, the association between the user's NAI and the device's hostname that was stored at the RWHOIS server is removed. In some embodiments, the communication device might be required to present the nonce used for the initial registration and/or other credentials in order for the RWHOIS server to accept the de-registration. When the communication device de-registers with the RWHOIS server, the device may also de-register with the DNS server.

Figure 3:
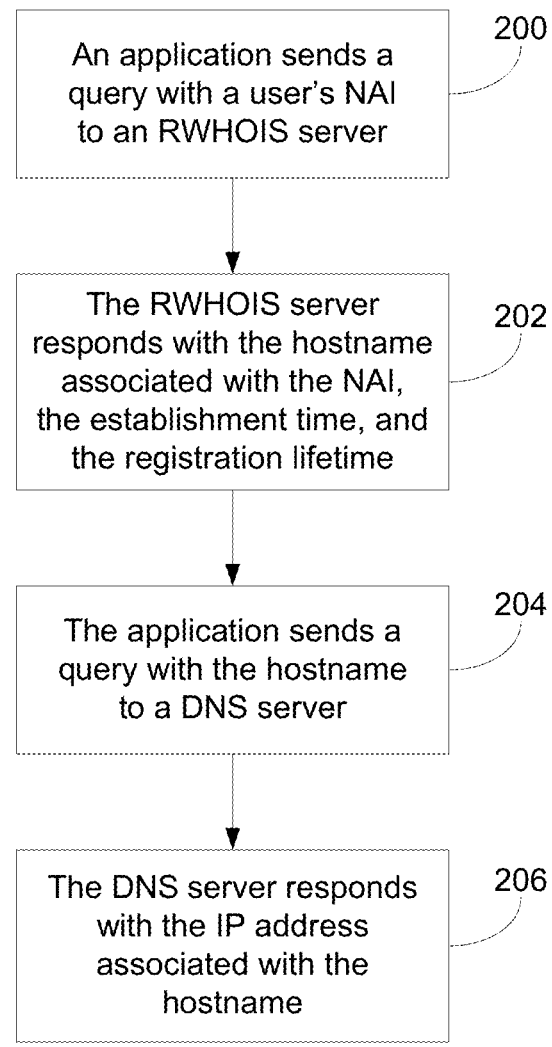
FIG. 3 is a flow chart illustrating a method for obtaining registered associations, in accordance with an exemplary embodiment.

In this way, RWHOIS system 40 and DNS system 42 may maintain information regarding which users have access to packet-switched network 12 and with which communication devices. The information may be current to within a registration lifetime. The information may then be made available for use by other network elements, such as by applications 44. FIG. 3 illustrates an exemplary process for obtaining information from an RWHOIS server and DNS server.

The process may begin when an application sends a query with a user's NAI to an RWHOIS server, as indicated by block 200. Thus, the application may be seeking information regarding a particular user. The RWHOIS server may respond with the hostname associated with the NAI, along with the establishment time and registration lifetime, as indicated by block 202. If the user is logged in from multiple communication devices, the RWHOIS server may respond with multiple hostnames (and multiple establishment times and registration lifetimes) associated with the user's NAI. The RWHOIS server would not, however, include the nonce from the communication device in the response.

Based on the response from the RWHOIS server, the application may determine that the user is "on network," i.e., accessible via packet-switched network 12. Moreover, the application may determine the particular communication device being used by the user based on the indicated hostname. For example, the application may determine that the user is currently using wireless communication device 14 rather than landline communication device 16. In addition, the application can ascertain how current the information is from the establishment time and registration lifetime.

The application may then use the hostname to seek additional information. For example, the application may send a query with the hostname to a DNS server, as indicated by block 204. The DNS server may respond with the IP address associated with the hostname, as indicated by block 206. The DNS server may also respond with additional information, such as one or more service identifiers associated with the hostname. In this way, the application may determine the IP address of a communication device that a particular user is using to access the packet-switched network and may also determine what services the particular user is using for communication. The application may then use this information to communicate with the user, e.g., by sending one or more messages to the IP address obtained from the DNS server.

It is to be understood that the queries illustrated in FIG. 3 are exemplary only. For example, an application might be seeking only the hostname of the device being used by a user and, thus, might not query the DNS server for the IP address. In addition, rather than make the initial query based on NAI (or other user identifier), an application may initially query the RWHOIS server based on hostname (or other identifier) to identify the user using that device. In yet another possibility, an application may initially query the DNS server to determine the hostname associated with an IP address and then query the RWHOIS server to identify the user currently associated with the hostname. Other combinations of queries to the RWHOIS server and/or DNS server are possible. In addition, an application may include other types of search parameters in queries to the RWHOIS server and/or DNS server. For example, an application may include a service identifier when querying the DNS server.

In this way, a system of RWHOIS and DNS servers may be used to keep current information regarding the users accessing packet-switched network 12. Moreover, this information may be made available to various applications for various purposes.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a communication device being used by a user, said communication device having a device identifier, said user having a user identifier, said method comprising:
   obtaining, by said communication device, a network address assigned to said communication device;
   in response to obtaining said network address, said communication device registering with a first server a first association between said network address and said device identifier by sending a first message to said first server; and
   in response to obtaining said network address, said communication device registering with a second server a second association between said device identifier and said user identifier by sending a second message to said second server.

2. The method of claim 1, wherein said communication device is a wireless communication device.

3. The method of claim 1, wherein said communication device is a landline communication device.

4. The method of claim 1, wherein said network address is an Internet Protocol (IP) address.

5. The method of claim 1, wherein said device identifier is a hostname.

6. The method of claim 5, wherein said first server is a domain name server.

7. The method of claim 6, wherein said first message is a DNS UPDATE message.

8. The method of claim 1, wherein said user identifier is a network access identifier (NAI).

9. The method of claim 8, wherein said second server is an RWHOIS server.

10. The method of claim 9, wherein said second message includes a key generated by said communication device.

11. The method of claim 9, wherein said second message includes an establishment time, wherein said establishment time indicates when said network address was assigned.

12. The method of claim 9, furthering comprising:
    said communication device receiving an acknowledgement message from said RWHOIS server, wherein said acknowledgement message includes a registration lifetime of said second association.

13. The method of claim 12, further comprising:
    said communication device re-registering said second association within said registration lifetime.

14. The method of claim 9, wherein said second message is an RWHOIS protocol directive.

* * * * *